United States Patent [19]
Yoon et al.

[11] Patent Number: 5,922,099
[45] Date of Patent: Jul. 13, 1999

[54] APPARATUS AND METHOD FOR FABRICATING TUBE-SHAPED GLASS MONOLITH USING SOL-GEL PROCESS

[75] Inventors: Young-Sik Yoon, Gumi-shi; Young-Min Baik, Kumi-shi; Sun-Uk Kim; Myung-Chul Jun, both of Pohang-shi, all of Rep. of Korea

[73] Assignee: SamSung Electronics Co., Ltd., Suwon, Rep. of Korea

[21] Appl. No.: 09/037,525

[22] Filed: Mar. 10, 1998

[30] Foreign Application Priority Data

Mar. 10, 1997 [KR] Rep. of Korea .......................... 97-7972
Mar. 10, 1997 [KR] Rep. of Korea .......................... 97-7976

[51] Int. Cl.⁶ ...................................................... C03B 8/02
[52] U.S. Cl. ................................. 65/395; 65/17.2; 65/323; 65/374.1; 65/374.12; 65/900; 65/901; 65/DIG. 9; 425/86; 425/468; 425/577
[58] Field of Search ........................... 65/17.2, 395, 396, 65/323, 374.1, 374.12, 900, 901, DIG. 9; 425/86, 468, 577

[56] References Cited

U.S. PATENT DOCUMENTS

| | | | |
|---|---|---|---|
| 4,323,381 | 4/1982 | Matsuyama et al. | 65/395 |
| 4,419,115 | 12/1983 | Johnson, Jr. et al. | 65/395 |
| 4,684,386 | 8/1987 | Clasen | 65/395 |
| 4,689,066 | 8/1987 | Clasen et al. | 65/395 |
| 4,786,302 | 11/1988 | Osafune et al. | 65/396 |
| 5,250,096 | 10/1993 | Bruce et al. | 65/390 |
| 5,352,259 | 10/1994 | Oku et al. | 65/412 |

FOREIGN PATENT DOCUMENTS

3001 792 C2  9/1985  Germany .
61-275139  12/1986  Japan .
62-87426  4/1987  Japan .

OTHER PUBLICATIONS

Patent Abstracts of Japan JP–1–61–275139, C–419 Apr. 30, 1987 vol. 11 No. 136.

*Primary Examiner*—Stanley S. Silverman
*Assistant Examiner*—Sean Vincent
*Attorney, Agent, or Firm*—Robert E. Bushnell, Esq.

[57] ABSTRACT

There are provided tube-shaped glass monolith fabricating apparatus and method using a sol-gel process. In the tube-shaped glass monolith fabricating method using a tube-shaped glass monolith fabricating apparatus which has an upper mold including cylindrical portions of different sizes, a lower mold including a first lower cylindrical portion inclined toward the center thereof by a predetermined degree and a second lower cylindrical portion having a vacuum releasing hole, a cylindrical central mold for forming a tube-shaped glass, and a rod-shaped rod, the lower mold, the central mold, and the rod are assembled and a sol is poured in the central mold. Then, an unmixable liquid is poured on the sol, and the upper mold is assembled to the central mold. The sol is gelled in the central mold, the upper mold is removed, a cap is opened to release vacuum, and the rod is removed. A small amount of the unmixable liquid remains in a gel hole formed in the center of the gel and the vacuum releasing hole is plugged with the cap. An upper portion of the gel hole is sealed with a sealing paper. Subsequently, the gel is dried for a predetermined time, the central mold is removed from the gel, and the gel is dried until the gel completely shrinks. Finally, the sealing paper and the unmixable liquid are removed from the gel. Thus, a tube-shaped dried gel is formed.

20 Claims, 4 Drawing Sheets

APPARATUS AND METHOD FOR FABRICATING TUBE-SHAPED GLASS MONOLITH USING SOL-GEL PROCESS

CLAIM OF PRIORITY

This application makes reference to, incorporates the same herein, and claims all benefits accruing under 35 U.S.C. §119 from an application entitled Apparatus And Method For Fabricating Tube-Shaped Glass Monolith Using Sol-Gel Process earlier filed in the Korean Industrial Property Office on Mar. 10, 1997, and there duly assigned Ser. Nos. 97-7972 and 97-7976 by that Office.

BACKGROUND OF THE INVENTION

1. Field of the Invention

The present invention relates to an optical fiber forming glass tube fabricating method using a sol-gel process, and in particular, to an apparatus and method for fabricating a tube-shaped glass monolith using a sol-gel process, which can direct a moist gel to unidirectionally dry and shrink.

2. Description of the Related Art

In general, an optical fiber preform is fabricated by inside deposition such as MCVD (Modified Chemical Vapor Deposition) or outside deposition such as VAD (Vapor phase Axial Deposition) and OVD (Outside Vapor Deposition). Among them, MCVD is most generally used in fabrication of high-quality optical fibers. In the MCVD, a preform is fabricated using a high-purity glass tube by inside deposition and overcladding. The glass tube essentially used in the MCVD is more pure and more cost-competitive when fabricated using a sol-gel process than that fabricated by other technology.

A glass tube is fabricated in a general sol-gel process as follows. A first sol is formed by dispersing fine fumed silica particles in deionized water to prevent cracking. The first sol is than gelled and the gel is then dried. The dried first gel becomes powder through grinding and classification, is thermally treated, and is re-dispersed in deionized water. Thus, a second sol is formed. The second sol is gelled in a mold, removed from the mold, dried, and then sintered to form a glass monolith.

To dry a tube-shaped moist gel in this glass tube fabrication process, the gel is first removed from a mold and dried for a long time at constant temperature and humidity. U.S. Pat. No. 5,250,096 to Allan J. Bruce, et al., entitled, Sol-Gel Method Of Making Multicomponent Glass, describes forming a first sol using a mixture of Si-alkoxide, alcohol (e.g. ethanol) and one or more metal compounds added to an appropriate liquid (alcohol if the compound is an alkoxide or an aqueous medium if the compound is a soluble salt). The first sol is gelled at 60 degrees Celsius, broken down to a fine powder and dried at a temperature between 60 and 150 degrees Celsius. The powder is redispersed in water, having its pH adjusted by the addition of an acid, to form a second sol, cast in molds of glass tubing and rubber stoppers to gel. The gel is removed from the mold, dried and sintered to form a low alkali silica glass. Other molds are discussed in U.S. Pat. No. 4,419,115 to David W. Johnson, Jr., et al., entitled Fabrication Of Sintered Hih-Silica Glasses, U.S. Pat. No. 4,786,302 to Haruo Osafune, et al., entitled, Method Of Preparing Tubular Silica Glass and U.S. Pat. No. 5,352,259 to Masato Oku, et al., entitled Method Of Manufacturing Optical Fiber Preform.

Some conventional gel drying method is limited in molding a dried gel to a thickness of 15 mm or above due to the difference between shrinkage rates of the inner and outer surfaces of the tube-shaped gel when it is dried. It is very difficult to mold the gel into a tube shape because the outer and inner surfaces of the moist gel are concurrently dried and thus develop shrinkage stresses. In addition, the moist gel is dried for a long time at constant temperature and humidity, thereby increasing fabrication cost and making it impossible to extend the gel lengthwise.

The dried gel is vulnerable to cracking even at a slight impact, and should be at least about 1 m long to mold an optical fiber forming glass tube. However, a conventional tube-shaped glass forming mold cannot relieve the gel of stresses caused by uniformless shrinkage in a lower portion of the gel due to longitudinal load of the moist gel. Hence, the dried gel is highly vulnerable to cracking, cannot be further extended lengthwise, and is unsuitable for an optical fiber forming glass tube.

SUMMARY OF THE INVENTION

An object of the present invention is to provide a tube-shaped glass monolith fabricating apparatus using a sol-gel process, which can fabricate a large crack-free glass tube for use in fabricating an optical fiber by minimizing stresses on a gel caused by the shrinkage of the gel during drying a moist gel.

Another object of the present invention is to provide a tube-shaped glass monolith fabricating apparatus using a sol-gel process, which can extend a gel lengthwise by distributing and reducing a shrinking force imposed on a lower portion of a moist gel and the load of the gel.

Still another object of the present invention is to provide a tube-shaped glass monolith fabricating method using a sol-gel process, which can fabricate a large glass tube by unidirectionally drying a tube-shaped moist gel.

Still yet another object of the present invention of the present invention is to provide a tube-shaped glass monolith fabricating method using a sol-gel process, which can prevent a gel from cracking during drying the gel by directing the gel to shrink from outside to inside.

A further object of the present invention is to provide a tube-shaped glass monolith fabricating method using a sol-gel process, which can fabricate an optical fiber forming overcladding tube.

To achieve the above objects, there is provided a tube-shaped glass monolith fabricating apparatus using a sol-gel process. The tube-shaped glass monolith fabricating apparatus using a sol gel process including gelation and drying steps has an upper mold having cylindrical portions of different sizes and a first fixing hole in the center thereof. A lower mold has a second fixing hole in the center thereof, a first lower cylindrical portion inclined toward the center thereof to minimize stresses generated during the gelation or drying step, and a second lower cylindrical portion having a vacuum releasing hole to prevent vacuum-induced stresses during the drying step. A central mold is disposed between the upper mold and the lower mold, a sol is poured therein gelation and drying steps are performed on the sol. A rod-shaped rod is installed along the central longitudinal axis of the central mold, for molding a gel into a tube after the drying step.

According to another aspect of the present invention, there is provided a tube-shaped glass monolith fabricating method using a sol-gel process. In the tube-shaped glass monolith fabricating method using a tube-shaped glass monolith fabricating apparatus which has an upper mold including cylindrical portions of different sizes, a lower mold including a first lower cylindrical portion inclined toward the center thereofby a predetermined degree and a second lower cylindrical portion having a vacuum releasing hole, a cylindrical central mold for forming a tube-shaped glass, and a rod-shaped rod, the lower mold, the central mold, and the rod are assembled and a sol is poured in the central mold. Then, an unmixable liquid is poured on the sol, and the upper mold is assembled to the central mold. The sol is gelled in the central mold, the upper mold is removed, a cap is opened to release vacuum, and the rod is removed. A small amount of the unmixable liquid remains in a gel hole formed in the center of the gel and the vacuum releasing hole is filled with the cap. An upper portion of the gel hole is sealed with a sealing paper. Subsequently, the gel is dried for a predetermined time, the central mold is removed from the gel, and the gel is dried until the gel completely shrinks. Finally, the sealing paper and the unmixable liquid are removed from the gel. Thus, a tube-shaped dried gel is formed.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
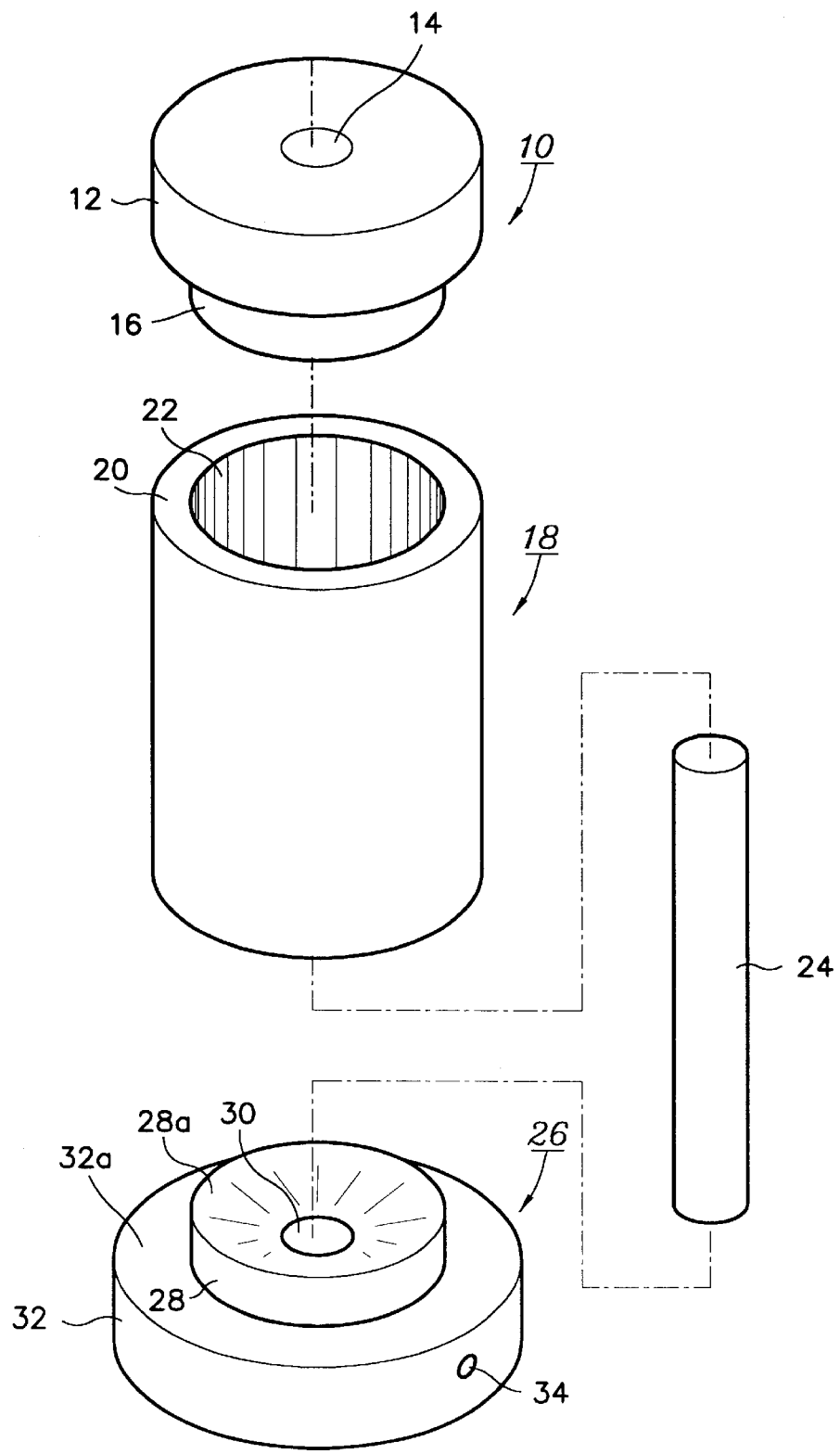
FIG. 1 is an exploded perspective view of a mold for forming a tube-shaped glass monolith in a sol-gel process according to a preferred embodiment of the present invention.
Figure 2:
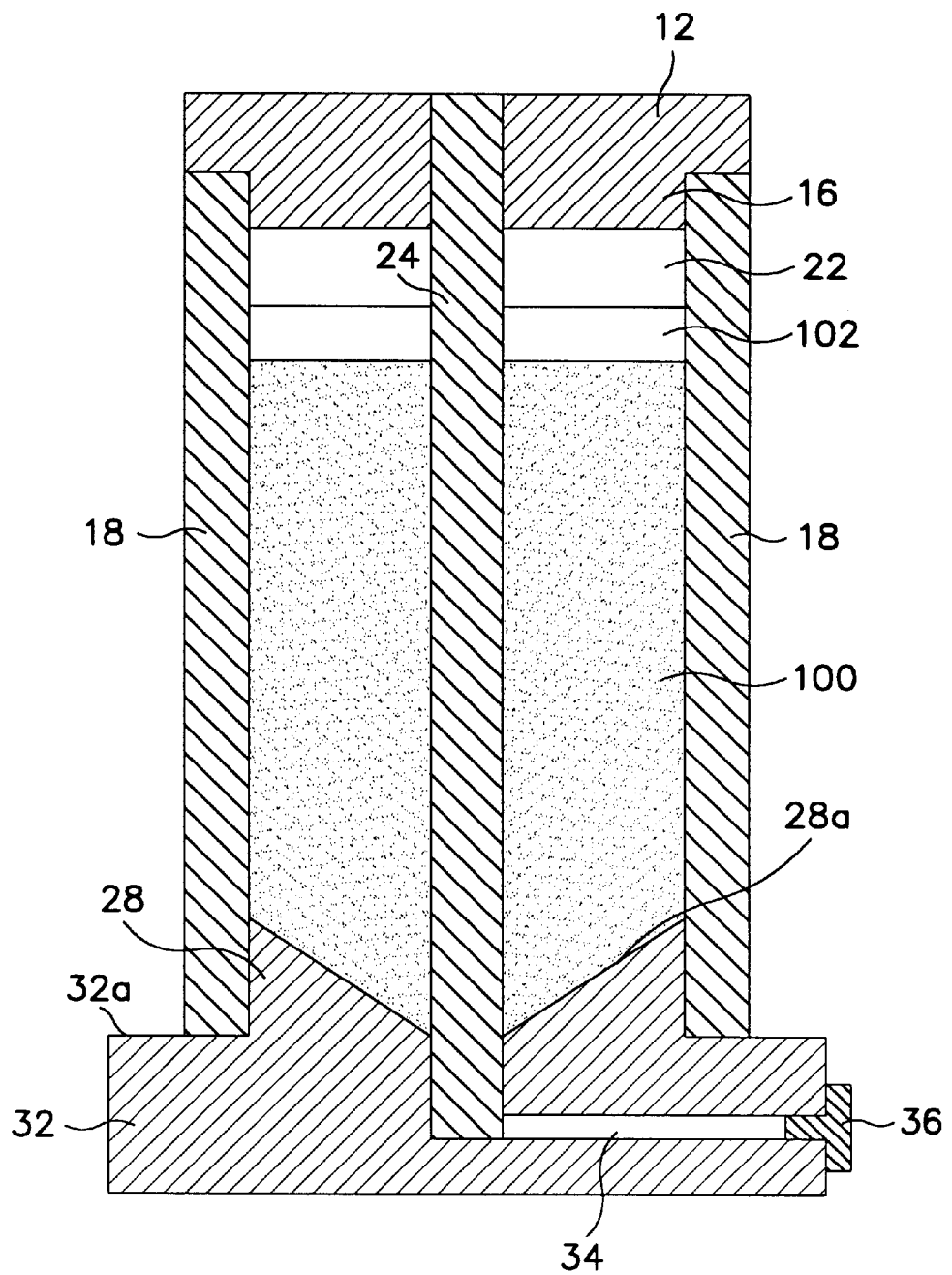
FIG. 2 is a side sectional view of the assembled mold for fabricating a tube-shaped glass monolith in a sol-gel process, referred to for depicting a gelation step of a tube-shaped glass monolith fabricating method using a sol-gel process, according to the preferred embodiment of the present invention.

FIG. 1 is an exploded perspective view of a mold for forming a tube-shaped glass monolith in a sol-gel process according to a preferred embodiment of the present invention, and FIG. 2 is a side sectional view of the assembled mold for fabrication of a tube-shaped glass monolith in a sol-gel process according to the preferred embodiment of the present invention.

Referring to FIG. 1, a mold for use as a tube-shaped glass monolith fabricating apparatus using a sol-gel process is divided into an upper mold 10 (a stepped upper lid), a lower mold 26 (a stepped lower lid), a central mold 18, and a rod 24. Elements 10, 18, 24, and 26 each have smooth surfaces which contact the sol and are formed of polystyrene, polypropylene, teflon, or steel in order to mold a thick-wall tube.

The upper mold 10 is comprised of a first upper cylindrical portion 12 to be mounted on the central mold 18 and a second upper cylindrical portion 16 having a diameter smaller that the diameter of the first upper cylindrical portion 12 to engage with the inner surface of central mold 18. That is, the first and second upper cylindrical portions 12 and 16 are integrally formed and have a first fixing hole 14 in the centers thereof, for inserting the rod 24. The central mold 18 is cylindrical and has a bore 22 for retaining the fumed silica in the sol state during sol formation, gelation, and drying steps. The upper surface of the central mold 18 is a first mounting surface 20 for mounting the first upper cylindrical portion 12 of the upper mold 10 thereon. The rod 24 is to enable a gel to be formed into a tube and the central axis of rod 24 is coincident with the central axis of central mold 18.

The lower mold 26 is comprised of a first lower cylindrical portion 28 to be inserted into the bore 22 of the central mold 18, and a second lower cylindrical portion 32 for mounting the central mold 18 thereon. That is, the first and second lower cylindrical portions 28 and 32 are integrally formed and have a second fixing hole 30 in the centers thereof, for inserting the rod 24. The upper surface of the first lower cylindrical portion 28 is an inclined surface 28a inclined toward the center of the lower mold 26 by about 5–45° to minimize the downward shrinkage force of a gel and pressure generated from the inside of the gel to the outside thereof during a gelation or drying step. Here, the inclined surface 28a may be conical within about 5–45°. A vacuum releasing hole 34 is formed into one side surface of the second lower cylindrical portion 32, communicating with the second fixing hole 30, so that vacuum-induced stresses are not generated inside a tube-shaped gel when the rod 24 is removed to dry a moist gel molded from a sol. The vacuum releasing hole 34 is generally closed by a cap 36, as shown in FIG. 2.

To fabricate a large glass tube for use in fabrication of an optical fiber in the mold as constituted above, a sol is formed by mixing fumed silica with deionized water. Then, as shown in FIG. 2, the vacuum releasing hole 34 of the second lower cylindrical portion 32 is plugged with the cap 36, and the rod 24 is fixedly inserted into the second fixing hole 30 in the center of the lower mold 26. Then, the central mold 18 is mounted on the second mounting surface 32a of the second lower cylindrical portion 32, and the sol is poured in the bore 22 of the central mold 18 to a predetermined height. An unmixable liquid 102 unmixable with water and having a lower specific gravity than water is poured on the upper surface of the sol to prevent the sol from contacting outside air. Here, the unmixable liquid 102 is kerosine. The second upper cylindrical portion 16 of the upper mold 10 is fixedly inserted into the bore 22. Here, the first upper cylindrical portion 12 is mounted on the first mounting surface 20 of the central mold 18 and, simultaneously, the rod 24 is fixedly inserted into the first fixing hole 14 in the center of the upper mold 10. Then, the sol is gelled in the central mold 18 for about 24–72 hours. At this time, to accelerate the gelation, about 1% or less of an organic polymer is added to the sol, or the pH of the sol may be controlled.

Figure 3:
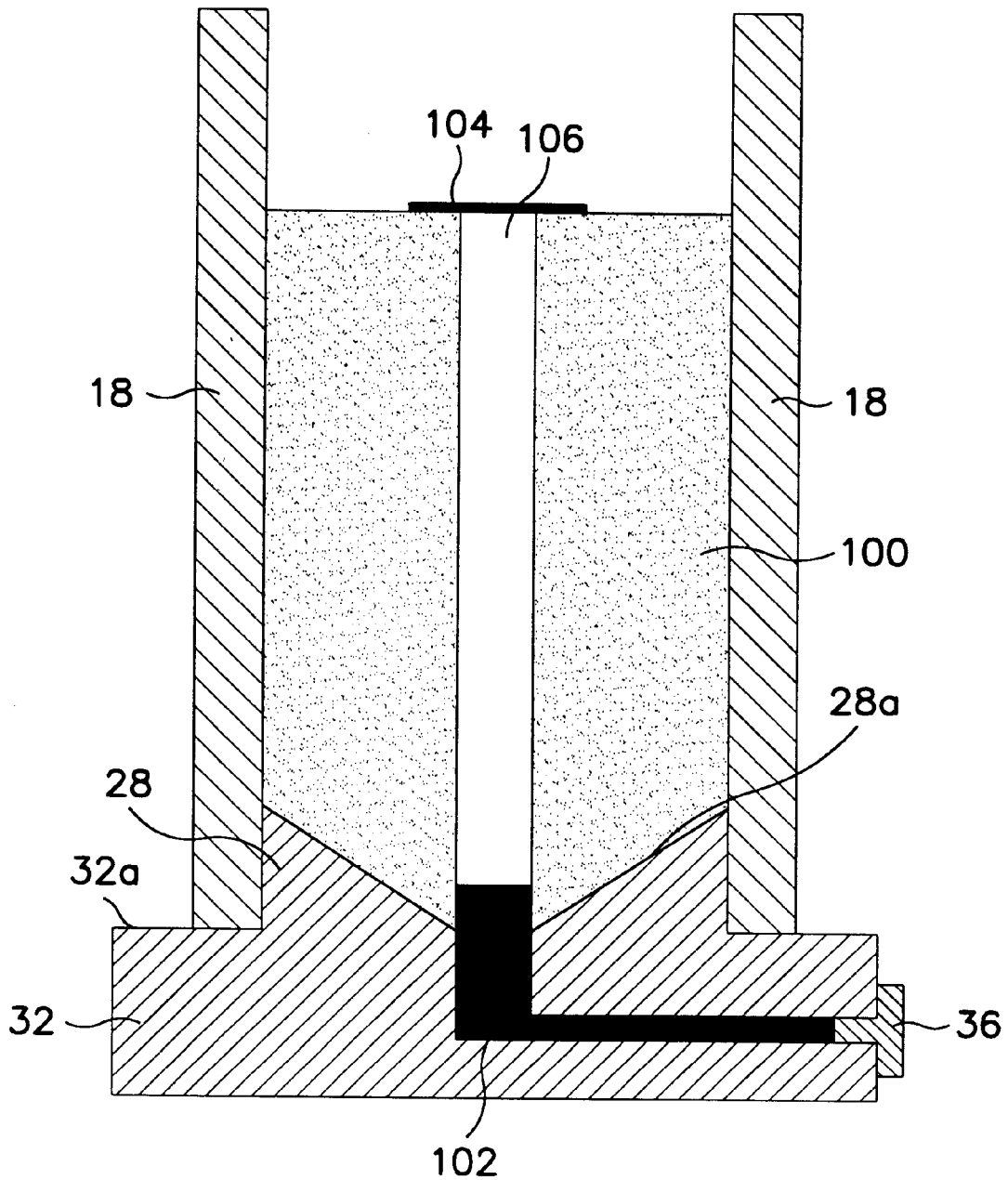
FIG. 3 is a side sectional view of the mold, for depicting a drying step of the tube-shaped glass monolith fabricating method using a sol-gel process according to the preferred embodiment.

After the gelation, the upper mold 10 is removed, the vacuum releasing hole 34 in the second lower cylindrical portion 32 is opened by removing the cap 36, and the rod 24 is slowly retracted upward. At this time, air is introduced into the vacuum releasing hole 34 and the second fixing hole 30, that is, no vacuum occurs during the removal of rod 24. The unmixable liquid 102 flows into the gel hole 106 and comes out through the vacuum releasing hole 34, as shown in FIG. 3. Then, the unmixable liquid 102 is continuously evacuated by a predetermined amount, and the vacuum releasing hole 34 is again plugged with the cap 36 when the unmixable liquid 102 remaining in the gel hole 106 (see FIG. 3) is at a height of 10 mm, in order to prevent outside air from contacting a lower portion of the gel 100.

Figure 4:
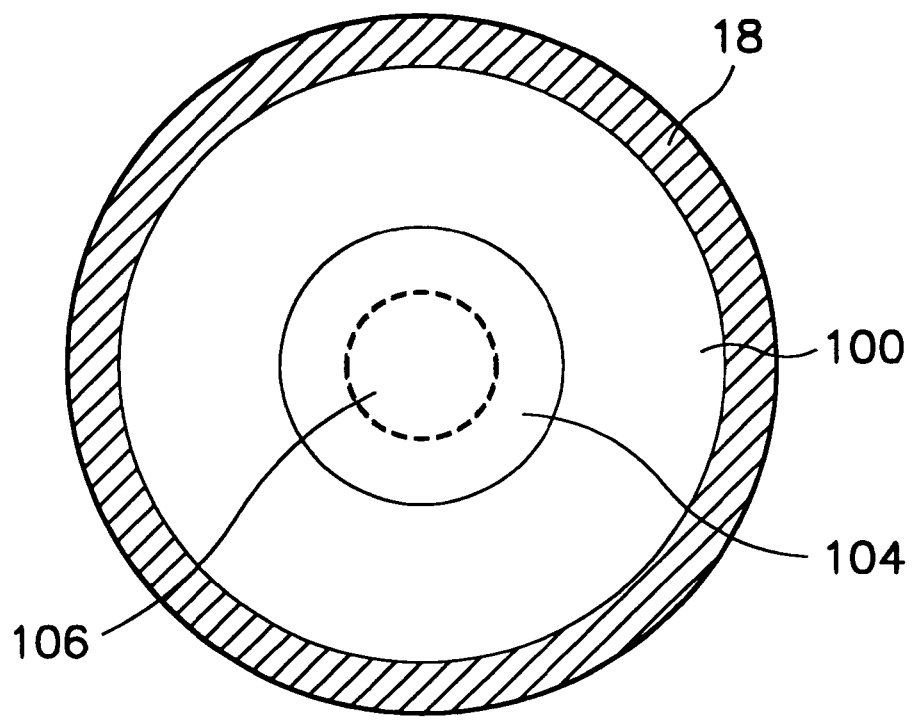
FIG. 4 is a plan view of the mold shown in FIG. 3.

As shown in FIGS. 3 and 4, an upper portion of the gel hole 106 is sealed with a sealing paper 104 to prevent shrinkage inside the gel hole 106, to regulate only the outside shrinkage of the gel hole 106, and to prevent the gel 100 from cracking. In addition, the sealing paper 104 is formed of wax paper, wrap film, or vinyl to be large enough to cover the gel hole 106.

When the outer surface of the moist gel 100 is detachable from the central mold 18, after the gel 100 is dried for a predetermined time, the central mold 18 is removed from the lower mold 26 and the moist gel 100 dried for about 3–7 days until the moist gel 100 is strong enough to resist cracking. Then, the sealing paper 104 is removed from the upper portion of the gel 100, and the remaining unmixable liquid 102 is removed from the gel hole 106 by opening the vacuum releasing hole 34. Then, the lower mold 26 is removed from the gel 100, thereby obtaining a crack-free dried tube-shaped gel 100.

Subsequently, the dried gel 100 is thermally treated at about 600–900° C. to be used for fabricating an optical fiber, and sintered at about 1300–1450° C. Thus, an optical fiber forming overcladding tube is completed.

As described above, the tube-shaped glass monolith fabricating method using a sol-gel process directs the gel to shrink from outside to inside during the drying step and unidirectionally dries the gel, thereby minimizing stresses of the gel caused by the gel shrinkage, and enabling a large crack-free glass tube for forming an optical fiber to be fabricated. In addition, a high-purity optical fiber forming glass tube can be molded and product cost is reduced. This method can be applied to large, high-purity monolith fabrication.

What is claimed is:

1. A tube-shaped glass monolith fabricating apparatus using a sol-gel process which includes gelation and drying steps, said apparatus comprising:

an upper mold having cylindrical portions of different diametrical sizes and a first fixing hole in the center thereof;

a lower mold having a second fixing hole in the center thereof, a first lower cylindrical portion inclined toward the second fixing hole to minimize stresses generated during the gelation or drying steps, and a second lower cylindrical portion having a vacuum releasing hole communicating with said second fixing hole to prevent vacuum-induced stresses during the drying step;

a central mold disposed between the upper mold and the lower mold, for receiving a sol therein and in which the gelation step occurs; and a rod installed along the central longitudinal axis of the central mold and engaged with said first and second fixing holes, for molding a gel into a tube during the gelation step.

2. The apparatus as set forth in claim 1, wherein said first lower cylindrical portion is inclined at an angle between 5–45°.

3. The apparatus as set forth in claim 1, wherein the upper surface of said first lower cylindrical portion has a cone shape.

4. The apparatus as set forth in claim 3, wherein the cone shape is inclined at an angle between 5–45°.

5. The apparatus as set forth in claim 1, wherein the surfaces of the respective molds and rod in contact with the sol are smooth to make the surface of a tube-shaped glass smooth.

6. The apparatus as set forth in claim 1, wherein the upper mold, the central mold, the lower mold, and the rod are formed of polystyrene.

7. The apparatus as set forth in claim 1, wherein the upper mold, the central mold, the lower mold, and the rod are formed of polypropylene.

8. The apparatus as set forth in claim 1, wherein the upper mold, the central mold, the lower mold, and the rod are formed of teflon.

9. The apparatus as set forth in claim 1, wherein the upper mold, the central mold, the lower mold, and the rod are formed of steel.

10. A tube-shaped glass monolith fabricating method using a sol-gel process in a tube-shaped glass monolith fabricating apparatus which has a upper mold including stepped cylindrical portions of different diametrical sizes, a lower mold including a first lower cylindrical portion inclined toward the center thereof by a predetermined degree and a second lower cylindrical portion having a vacuum releasing hole, a cylindrical central mold for forming a tube-shaped glass, and a rod, comprising the steps of:

assembling the lower mold, the central mold, and the rod, and pouring a sol in the central mold;

pouring an unmixable liquid on the sol to prevent air from contacting the sol;

assembling the upper mold to the central mold;

gelling the sol in the central mold;

removing the upper mold, opening a cap plugging said vacuum releasing hole to release vacuum, and removing the rod, whereby said unmixable liquid enters a gel hole formed in said gel by the removal of said rod;

maintaining a small amount of the unmixable liquid in said gel hole by closing said vacuum releasing hole with said cap;

sealing an upper portion of the gel hole with a sealing paper;

drying the gel for a predetermined time, removing the central mold from the dried gel, and drying the gel further until the gel completely shrinks; and removing the sealing paper and the unmixable liquid from the gel, thereby forming a tube-shaped dried gel.

11. The method as set forth in claim 10, wherein said unmixable liquid has a lower specific gravity than water.

12. The method as set forth in claim 10, wherein said unmixable liquid is kerosine.

13. The method as set forth in claim 10, wherein said gelling step is performed for about 24–72 hours.

14. The method as set forth in claim 10, wherein 1% or less of an organic polymer is added to the sol during said gelling step to accelerate gelation.

15. The method as set forth in claim 10, wherein said sealing paper is formed of wax paper.

16. The method as set forth in claim 10, wherein said sealing paper is formed of wrap film.

17. The method as set forth in claim 10, wherein said sealing paper is formed of vinyl.

18. The method as set forth in claim 10, said drying step is performed for about 3–7 days.

19. The method as set forth in claim 10, wherein the tube-shaped dried gel is thermally treated and sintered at a predetermined temperature, and then becomes an optical fiber forming overcladding tube.

20. The method as set forth in claim 10, wherein the tube-shaped dried gel is thermally treated at about 600–900° C., and then sintered at 1300–1450° C., to thereby form an optical fiber forming overcladding tube.

* * * * *